(12) United States Patent
LoPresto

(10) Patent No.: US 10,124,900 B2
(45) Date of Patent: Nov. 13, 2018

(54) AUTOMATED SUPER-COOLED WATER-DROPLET SIZE DIFFERENTIATION USING AIRCRAFT ACCRETION PATTERNS

(71) Applicant: Rosemount Aerospace Inc., Burnsville, MN (US)

(72) Inventor: Vincent R. LoPresto, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 65 days.

(21) Appl. No.: 15/195,811

(22) Filed: Jun. 28, 2016

(65) Prior Publication Data

US 2017/0369176 A1    Dec. 28, 2017

(51) Int. Cl.
| | |
|---|---|
| *G01P 13/02* | (2006.01) |
| *B64D 15/20* | (2006.01) |
| *B64D 45/00* | (2006.01) |
| *B64D 47/08* | (2006.01) |
| *G08B 19/02* | (2006.01) |

(52) U.S. Cl.
CPC ............ *B64D 15/20* (2013.01); *B64D 45/00* (2013.01); *B64D 47/08* (2013.01); *G01P 13/025* (2013.01); *G08B 19/02* (2013.01)

(58) Field of Classification Search
None
See application file for complete search history.

(56) References Cited

U.S. PATENT DOCUMENTS

| | | | | |
|---|---|---|---|---|
| 5,313,202 A | * | 5/1994 | Hansman, Jr. ......... | G08B 19/02 244/134 R |
| 6,269,320 B1 | * | 7/2001 | Otto ....................... | B64D 15/20 244/134 C |

(Continued)

FOREIGN PATENT DOCUMENTS

| | | |
|---|---|---|
| CN | 205256681 U | 5/2016 |
| EP | 2325083 A1 | 5/2011 |

(Continued)

OTHER PUBLICATIONS

Extended European Search Report, for European Patent Application No. 17178354.1, dated Sep. 5, 2017, 8 pages.

*Primary Examiner* — Andre Allen
(74) *Attorney, Agent, or Firm* — Kinney & Lange, P.A.

(57) ABSTRACT

Apparatus and associated methods relate to determining, based on a spatial extent of ice accretion, a maximum size of super-cooled droplets contained in an atmosphere and/or if an atmosphere contains super-cooled water droplets that equal and/or exceed a predetermined size. A testing region on an exterior surface of an aircraft is monitored for ice accretion by an ice detector. A boundary calculator determines a specific location to be tested within the testing region. The determined specific location corresponds to a calculated boundary that separates an ice-accretion region from an ice-free region if the atmosphere contains super-cooled water droplets of no larger than the predetermined size. If the ice detector detects ice accretion at the determined specific location, an alert is generated. The alert can advantageously inform a pilot of the aircraft that the atmosphere contains super-cooled water droplets that equal or exceed the predetermined size.

20 Claims, 8 Drawing Sheets

(56) References Cited

U.S. PATENT DOCUMENTS

| | | | |
|---|---|---|---|
| 6,560,551 B1* | 5/2003 | Severson | B64D 15/22 340/582 |
| 7,312,713 B2 | 12/2007 | Alfano et al. | |
| 8,462,354 B2 | 1/2013 | Barnes | |
| 9,227,733 B2 | 1/2016 | Meis et al. | |
| 2002/0158768 A1* | 10/2002 | Severson | B64D 15/20 340/581 |
| 2004/0231410 A1* | 11/2004 | Bernard | B64D 15/20 73/170.26 |
| 2013/0113926 A1 | 5/2013 | Chen et al. | |
| 2015/0042316 A1* | 2/2015 | Inkpen | B64D 15/20 324/157 |

FOREIGN PATENT DOCUMENTS

| | | |
|---|---|---|
| GB | 2250967 A | 6/1992 |
| WO | 2014108695 A1 | 7/2014 |

* cited by examiner

AUTOMATED SUPER-COOLED WATER-DROPLET SIZE DIFFERENTIATION USING AIRCRAFT ACCRETION PATTERNS

BACKGROUND

Certain atmospheric conditions can lead to ice formation on aircraft surfaces. Ice formation on aircraft surfaces can increase the weight of the aircraft and can increase the drag of the aircraft. Increasing either the weight or the drag of an aircraft can result in a stall speed that is higher than it would otherwise be in an ice-free condition. Ice formation on lifting surfaces can result in a decrease in a wing's lift and/or a decrease in a propeller's thrust. Ice formation can also affect the controllability of an aircraft by affecting the airflow over control surfaces, such as ailerons.

Various atmospheric conditions can cause more or less ice formation on an aircraft. For example, water droplet density, total moisture content, air temperature, water droplet temperature, droplet size distribution, etc. all factor into risk of ice formation. Some atmospheric conditions can present little or no risk of ice formation on an aircraft.

Various aircraft flying conditions can affect locations and/or amounts of ice formation on aircraft surfaces. For example, airspeed, angle of attack, angle of side-slip, and presence of de-icing equipment all factor into location and/or risk of ice formation.

Some aircraft have been equipped with equipment intended to obtain metrics of the atmosphere so as to predict whether the atmosphere presents a risk of ice-formation on exterior surfaces. Ice formation on aircraft surfaces can be visually perceived by the pilot, should the ice form on a surface within view of the cockpit window.

SUMMARY

Apparatus and associated devices relate to a super-cooled water droplet measurement system that includes an ice detector configured to detect ice accretion at a plurality of test locations within a testing region of an exterior surface of an aircraft. Ice accretes, in conducive conditions, on at least an ice-accretion portion of the testing region. The super-cooled water droplet measurement system includes a boundary locator configured to determine a specific one of the plurality of test locations within the testing region of the exterior surface of the aircraft. The determined specific one of the plurality of test locations corresponding to a boundary that separates the ice-accretion portion of the testing region and an ice-free portion of the testing region in conditions that include the atmosphere having super-cooled water droplets up to a predetermined maximum size.

Some embodiments relate to a method for generating an alert if atmosphere exterior to an aircraft has super-cooled water droplets exceeding a predetermined size. The method includes providing a testing region of an exterior surface of an aircraft. The testing region is configured to permit, if conditions are conducive, ice accretion on at least an ice-accretion portion of the testing region. A boundary separates the ice-accretion portion from an ice-free portion of the testing region. A location of the boundary is indicative of a maximum size of super-cooled water droplets in an atmosphere. The method includes determining a test location within the testing region. The test location corresponds to a calculated boundary that separates the ice-accretion portion of the testing region and the ice-free portion in conditions that include an atmosphere having super-cooled water droplets exceeding the predetermined size. The method includes monitoring the determined test location within the testing region to detect whether ice accretes at the monitored test location.

DETAILED DESCRIPTION

Apparatus and associated methods relate to determining, based on a spatial extent of ice accretion, if an atmosphere contains super-cooled water droplets that equal or exceed a predetermined size. A testing region on an exterior surface of an aircraft is monitored for ice accretion by an ice detector. A boundary calculator determines a specific location to be tested within the testing region. The determined specific location corresponds to a calculated boundary that should separate an ice-accretion region from an ice-free region if the atmosphere contains super-cooled water droplets of no larger than the predetermined size. If the ice detector detects ice accretion at the determined specific location, an alert is generated. The alert can advantageously inform a pilot of the aircraft that the atmosphere contains super-cooled water droplets that equal or exceed the predetermined size.

Figure 1:
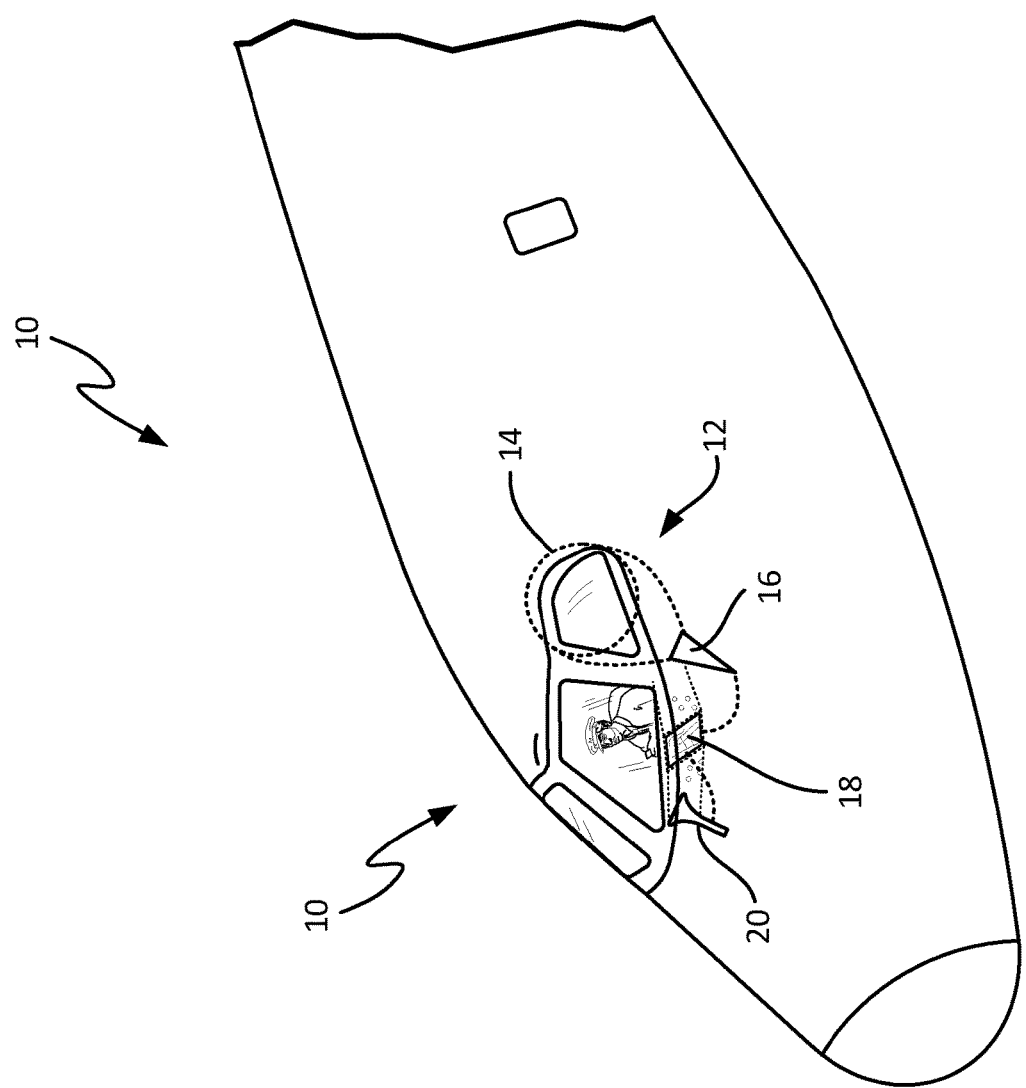
FIG. 1 is a schematic view of an aircraft equipped with an exemplary automated super-cooled-water-droplet size differentiation system.

FIG. 1 is a schematic view of an aircraft equipped with an exemplary automated super-cooled water-droplet size differentiation system. In FIG. 1, aircraft 10 has been equipped with super-cooled water-droplet size differentiator system 12. Super-cooled water-droplet size differentiator system 12 includes testing region 14, ice detector 16, ice boundary calculator 18 and alert system 20. In the depicted embodiment, testing region 14 includes a portion of an exterior surface of aircraft 10. When aircraft 10 is flying through a cloud that has super-cooled water droplets, ice can form on exterior surfaces of aircraft 10.

As will be described below, if conditions permit, ice preferentially forms at different locations on these exterior surfaces. Ice tends to form on leading edges of aircraft 10 and is less likely to form as the air moves more and more aft of these leading edges. Ice tends to form increasingly aft of the leading edge as the atmosphere contains super-cooled water droplets of increasing size. Testing region 14 can be selected such that ice will accrete on a portion of testing region 14 if the atmosphere contains super-cooled water droplets of a predetermined size. Various embodiments may use various testing regions. In some embodiments, testing region 14 may be located on the fuselage of aircraft 10, for example. In some embodiments, testing region 14 may be located on an airfoil, such as a wing or tail, of aircraft 10. In some embodiments, testing region 14 may be located on some appendage of aircraft 10.

In the depicted embodiment, testing region 14 includes a side window of the cockpit of aircraft 10. Testing region 14 is monitored by ice detector 16. Various types of ice detectors can be used in various embodiments. In some embodiments ice detector 16 can be a visual light camera. In some embodiments, ice detector 16 can be an infrared camera, for example. In some embodiments, a series of spot sensors may be used to detect ice accretion. Ice formation at an aft location within testing region 14 may be indicative of an atmosphere having super-cooled water droplets equal to or exceeding a predetermined size.

The specific aft location within testing region 14 that is indicative of an atmosphere having super-cooled water droplets equal to or exceeding the predetermined size can be affected by various conditions. Some such conditions that affect the indicative aft location include: aircraft parameters; flying parameters; and atmospheric conditions. Ice boundary calculator 18 calculates the indicative aft location based on one or more of these conditions. Various types of ice boundary calculators can be used in various embodiments. For example, in some embodiments, ice boundary calculator 18 may perform fluid dynamic computations to calculate the indicative aft location. In some embodiments, a look-up table may be used to determine the indicative aft location, for example.

If ice detector 16 detects ice accretion at the indicative aft location calculated by ice boundary calculator 18, then alert system 20 generates an alert signal. In various embodiments, various types of alert signals may be generated. For example, in some embodiments an audible alert signal may be generated. In some embodiments, an alert signal may be in the form of an electrical signal sent to a display device. For example, a display monitor may present an optical image of the testing region along with a flashing alert signal. In some embodiments, an alert signal may be in the form of a signal to another aircraft system. The signal may be provided as either a simple alert or it may be provided with additional information regarding the size of super-cooled water droplets in the atmosphere outside the aircraft.

Figure 2:
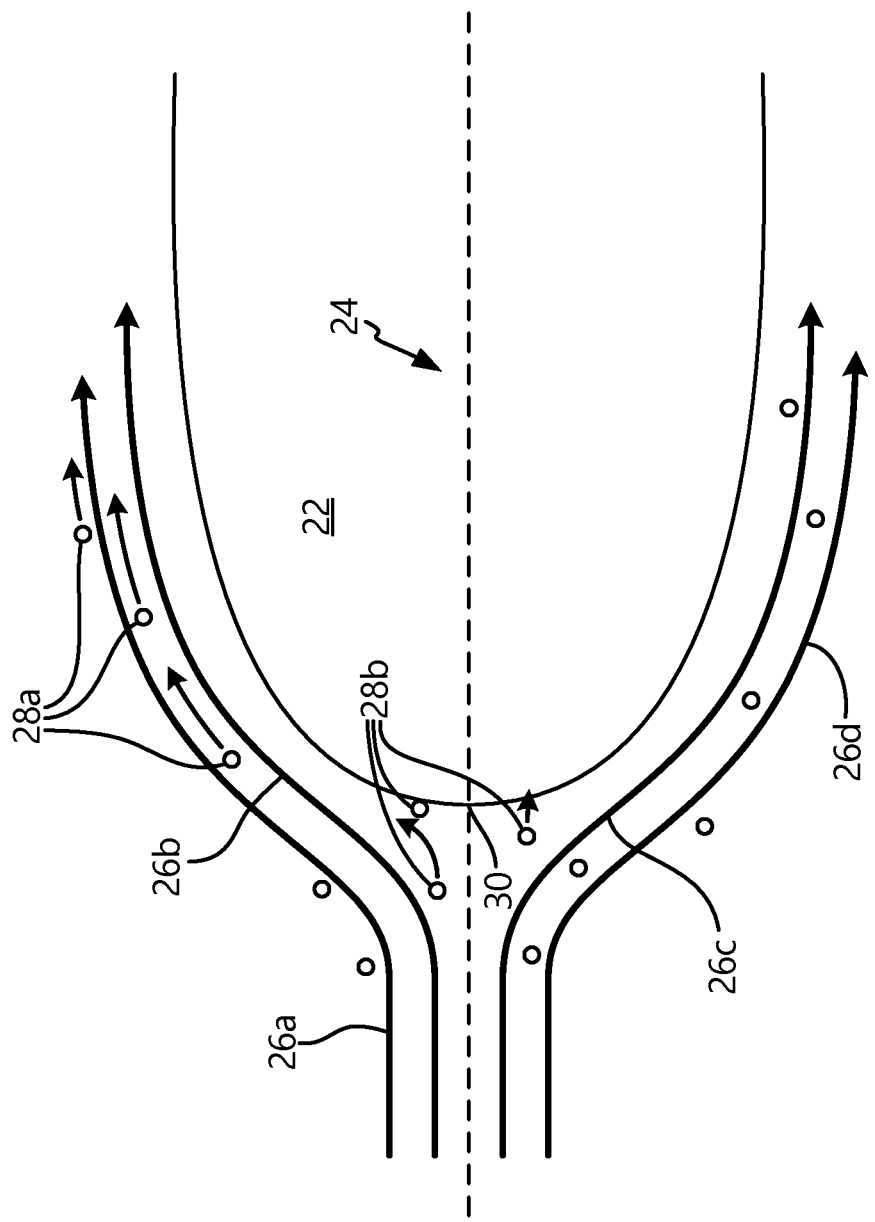
FIG. 2 is a schematic diagram of ice accreting on a leading edge of a curved member in an airstream.

FIG. 2 is a schematic diagram of ice accreting on a leading edge of a curved member in an airstream. In FIG. 2, three-dimensional airfoil 22 is shown in cross section. Airfoil 22 has flow-dividing axis 24 aligned with a general direction of airflow. Airflow is represented by flow vectors 26a, 26b, 26c, 26d. Water droplets 28a, 28b are carried by the airflow. Small water droplets 28a generally follow the flow vectors, because a mass of the small water droplets 28a is small. A momentum of the small water droplets 28a is correspondingly small, because of the small mass. Because the momentum is small for small water droplets, changing the direction, and thus the momentum, of these small water droplets can be achieved by small forces, such as those imparted by flow vectors 26a, 26b, 26c, 26d. Small water droplets 28a impinge airfoil 22 only proximate flow-dividing axis 24 at leading edge 30.

Large water droplets 28b, however, have momentums that are larger than those of small water droplets 28a, due to larger masses of the large water droplets 26b. Such large water droplets 28b do not follow flow vectors 26a, 26b, 26c, 26d as readily as do small water droplets 28a. Because large water droplets 28b more readily cross flow vectors 26a, 26b, 26c, 26d, such large water droplets 28b impinge airfoil 22 along a greater section of leading edge 30 than is impinged by small water droplets 28a. Large water droplets 28b impinge airfoil 22 proximate flow-dividing axis 24 at leading edge 30 as do small water droplets 28a. Large water droplets 28b also impinge airfoil 22 aft of leading edge 30 for a distance that is related to the droplet size. Airflow does impart a force on large water droplets 28b, and therefore large water droplets 28b do experience momentum change. Because large water droplets 28b can undergo such momentum change, these large water droplets impinge airfoil 22 only over a limited range about leading edge 30.

If water droplets 28a, 28b are super-cooled (e.g., at temperatures below a freezing temperature of water), then such particles can freeze upon impact with airfoil 22 or another object (e.g., a fuselage, etc.). Pure water can be super-cooled without freezing in the absence of a nucleation site. Such a scenario is not infrequent in cloud atmospheres. The shock of impingement and/or the structural nucleation sites presented by the impinging object can cause such super-cooled water droplets to freeze almost immediately upon such an impingement event.

Figure 3:
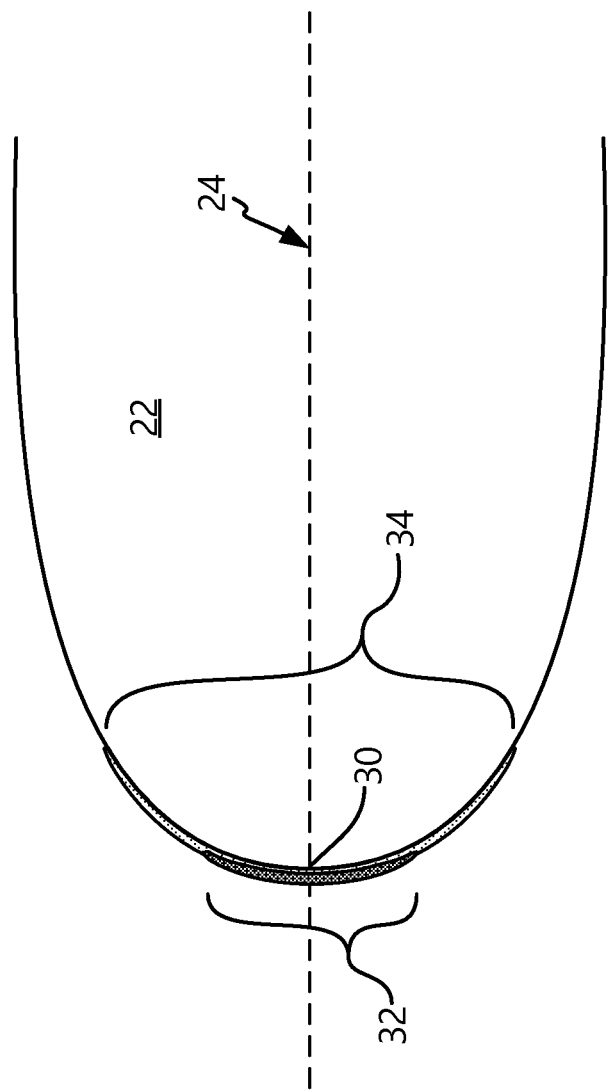
FIG. 3 is a schematic diagram depicting different zones of ice-accretion associated with different sizes of super-cooled water droplets.

FIG. 3 is a schematic diagram depicting different zones of ice-accretion associated with different sizes of super-cooled water droplets. In FIG. 3, airfoil 22 depicted in FIG. 2 is shown in magnification to demonstrate a relationship between water droplet size and impingement region. Two different impingement regions 32, 34 are depicted proximate leading edge 30 of airfoil 22. Impingement region 32 corresponds to a small region about leading edge 30.

Small impingement region 32 is a region in which water droplets, which are less than or equal to a relatively small size (such as small water droplets 28a depicted in FIG. 2), can impinge, for a given set of aircraft and flying conditions. Small water droplets 28a can readily follow flow vectors 26a, 26b, 26c, 26d (depicted in FIG. 2). Flow vectors 26a, 26b show an airflow pattern above airfoil 22, and flow vectors 26c, 26d show an airflow pattern below airfoil 22. Flow vectors 26a, 26b diverge from flow vectors 26c, 26d about central axis 24. Only at locations along leading edge 30 that are proximate central axis 24 can small water droplets 28a impinge airfoil 22. The intersection of leading edge 30 and flow-dividing axis 24 can be called the stagnation point.

Large impingement region 34 includes portions of airfoil 22 which can be impinged only by water droplets that are larger than a predetermined size (such as large water droplets 28b depicted in FIG. 2) for a given set of aircraft and flying conditions. Because larger water droplets 28b can cross flow vectors 26a, 26b, 26c, 26d more readily than can small water droplets 28a, such large water droplets 28b impinge airfoil 22 within larger region (e.g., large impingement region 34) about leading edge 30 than the region (e.g., small impingement region 32) impinged by small water droplets 28a. In this way, FIG. 3 demonstrates a relation that exists between a size of water droplets and a regional area in which such sized water droplets are capable of impingement.

Figure 4:
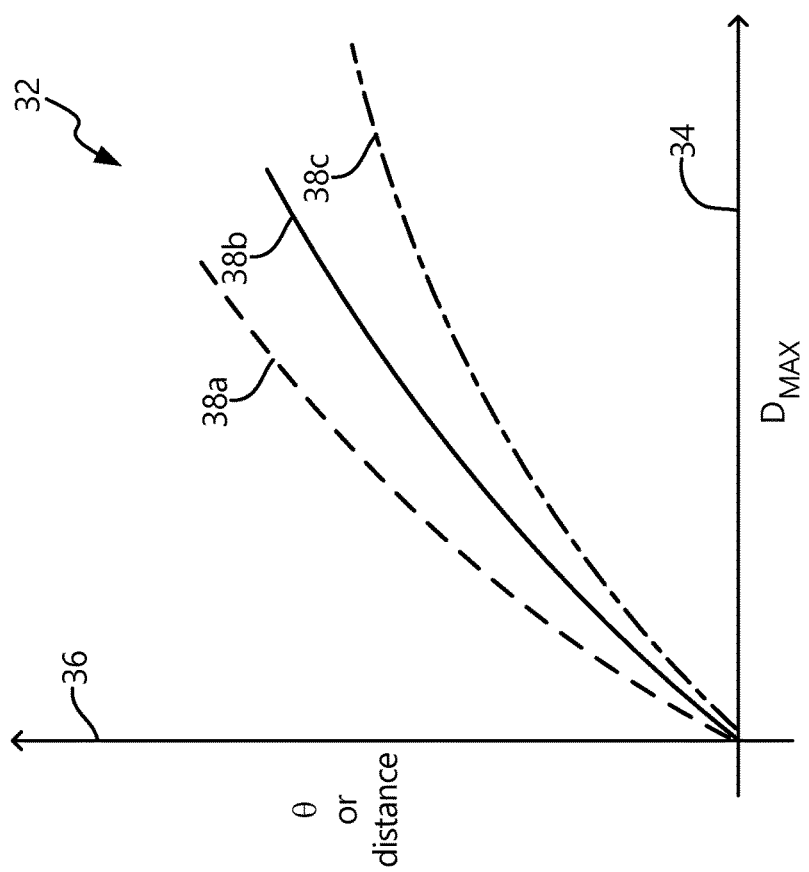
FIG. 4 is a graph of exemplary relations of size of an ice-accretion region versus size of super-cooled water droplets.

FIG. 4 is a graph of exemplary relations of size of an ice-accretion region versus size of super-cooled water droplets. In FIG. 4, graph 32 has horizontal axis 34 and vertical axis 36. Horizontal axis 34 represents maximum size $D_{MAX}$ of water droplets in an atmosphere. Vertical axis 36 represents a distance dimension (e.g., angle θ from stagnation point or chord length d from the stagnation point) of impingement region. Graph 32 has three relations 38a, 38b, 38c. Relation 38a represents a relation between maximum size $D_{MAX}$ of water droplets and distance dimension of impingement region for a first set of icing conditions. Relations 38b, 38c represent relations between maximum size $D_{MAX}$ of water droplets and distance dimension of impingement region for a second and a third set of icing conditions, respectively.

Parameters that affect icing conditions can include aircraft conditions, flying conditions, and atmospheric conditions, for example. Aircraft conditions can include, for example, a shape of a structure to which water droplets impinge, temperature of a surface of the impingement region, aircraft configuration, etc. Flying conditions can include, for example, an angle of attack, an angle of side-slip, an airspeed, water droplet temperature, liquid water content, etc. Atmospheric conditions can include air temperature, air pressure, etc. Various embodiments may be more or less affected by one or more of the icing conditions. For example, some embodiments may be more or less sensitive to angle of attack. A structure that presents substantially the same shape to the airflow independent of angle of attack, for example, may be not very sensitive to angle of attack. Some geometries may be less sensitive to angle of sideslip, for example.

Figure 5:
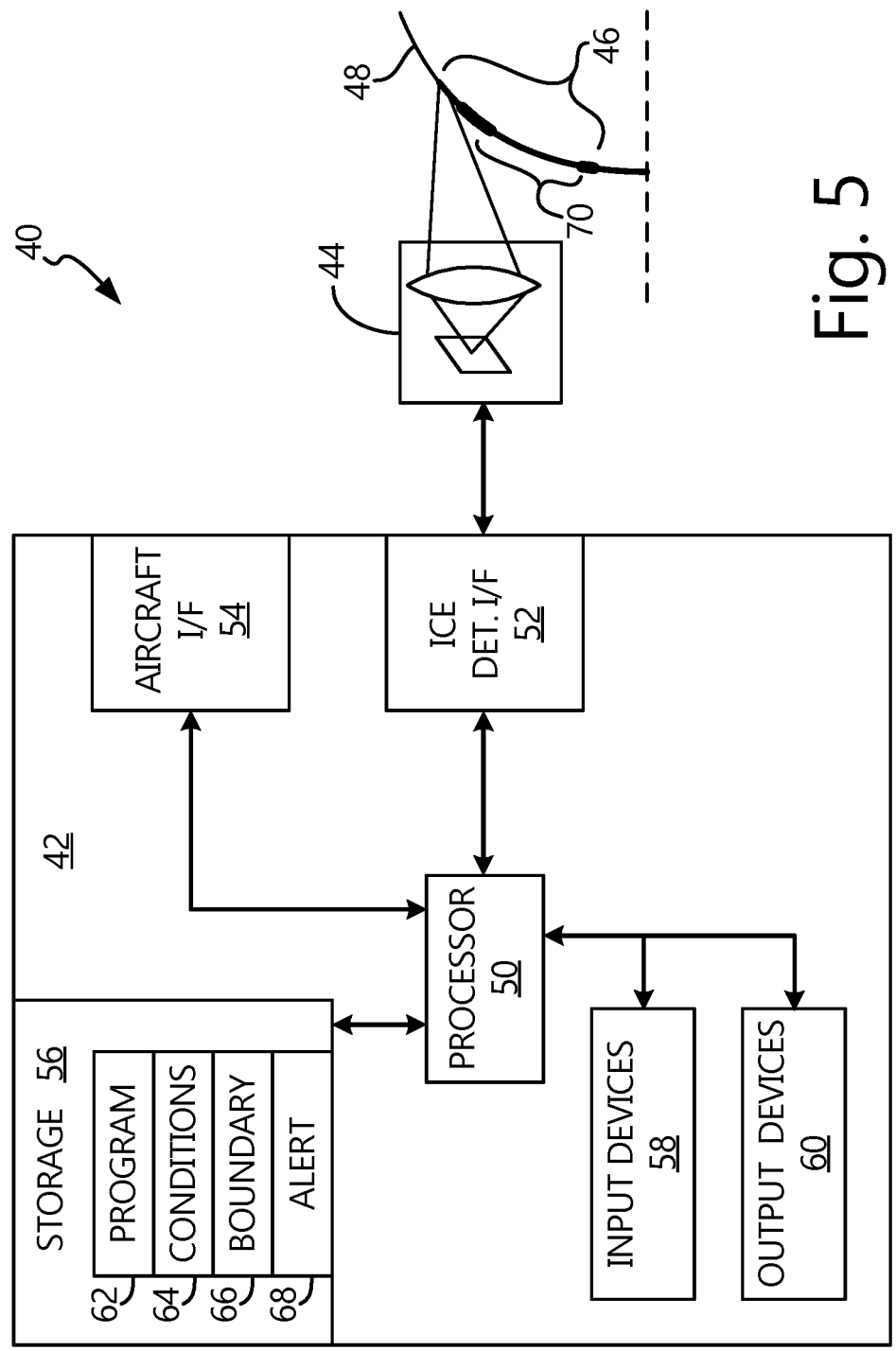
FIG. 5 is a block diagram of an exemplary ice-accretion alert system.

FIG. 5 is a block diagram of an exemplary ice-accretion alert system. In FIG. 5, ice-accretion alert system 40 includes controller 42, ice detector 44 and testing region 46 of exterior surface 48 of an aircraft. Controller 42 includes processor(s) 50, ice detector interface 52, aircraft interface 54, storage device(s) 56, user input devices 58, and user output devices 60. Storage device(s) 56 has various storage or memory locations. Storage device(s) 56 includes program memory 62, conditions data memory 64, boundary calculation module 66, and alert module 68. Controller 42 is in communication with ice detector 44. Ice detector 44 is configured to monitor ice accretion on testing region 46. Testing region 46 is depicted with ice-accretion portion 70 upon which ice has accreted.

As illustrated in FIG. 5, controller 42 includes processor(s) 50, ice detector interface 52, aircraft interface 54, storage device(s) 56, user input devices 58, and user output devices 60. However, in certain examples, controller 42 can include more or fewer components. For instance, in examples where controller 42 is an avionics unit, controller 42 may not include user input devices 58 and/or user output devices 60. In some examples, such as where controller 42 is a mobile or portable device such as a laptop computer, controller 42 may include additional components such as a battery that provides power to components of controller 42 during operation.

Processor(s) 50, in one example, is configured to implement functionality and/or process instructions for execution within controller 42. For instance, processor(s) 50 can be capable of processing instructions stored in storage device(s) 56. Examples of processor(s) 50 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 56 can be configured to store information within controller 42 during operation. Storage device(s) 56, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 56 is a temporary memory, meaning that a primary purpose of storage device(s) 56 is not long-term storage. Storage device(s) 56, in some examples, is described as volatile memory, meaning that storage device(s) 56 do not maintain stored contents when power to controller 42 is turned off. Examples of volatile memories can include random access memories (RAM), dynamic random access memories (DRAM), static random access memories (SRAM), and other forms of volatile memories. In some examples, storage device(s) 56 is used to store program instructions for execution by processor(s) 50. Storage device(s) 56, in one example, is used by software or applications running on controller 42 (e.g., a software program implementing long-range cloud conditions detection) to temporarily store information during program execution.

Storage device(s) 56, in some examples, also include one or more computer-readable storage media. Storage device(s) 56 can be configured to store larger amounts of information than volatile memory. Storage device(s) 56 can further be configured for long-term storage of information. In some examples, storage device(s) 56 include non-volatile storage elements. Examples of such non-volatile storage elements can include magnetic hard discs, optical discs, flash memories, or forms of electrically programmable memories (EPROM) or electrically erasable and programmable (EEPROM) memories.

Ice detector interface 52, in some examples, includes a communications module. Ice detector interface 52, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB).

Aircraft interface 54 can be used to communicate information between controller 42 and an aircraft. In some embodiments, such information can include aircraft conditions, flying conditions, and/or atmospheric conditions. In some embodiments, such information can include data processed by controller 42, such as, for example, alert signals. Aircraft interface 54 can also include a communications module. Aircraft interface 54, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi_33 radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User input devices 58, in some examples, are configured to receive input from a user. Examples of user input devices 58 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User output devices 60 can be configured to provide output to a user. Examples of user output devices 60 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Figure 6:
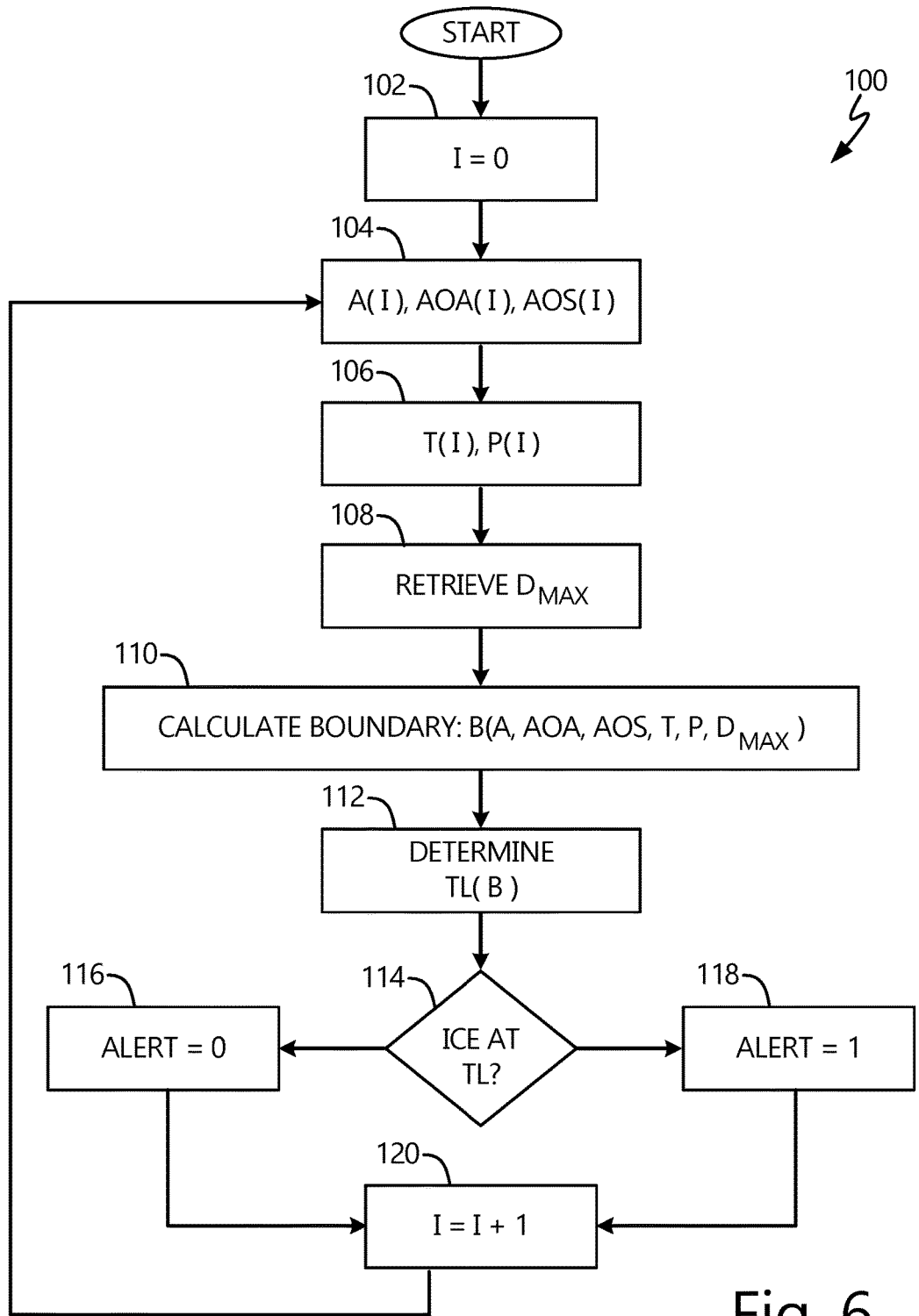
FIG. 6 is a flow chart of an exemplary method for generating an alert if atmosphere exterior to an aircraft has super-cooled water droplets exceeding a predetermined size.

FIG. 6 is a flow chart of an exemplary method for generating an alert if atmosphere exterior to an aircraft has super-cooled water droplets exceeding a predetermined size. In FIG. 6, method 100 is depicted from the vantage point of processor(s) 50 of FIG. 5. Method 100 begins at step 102 where processor(s) 50 initializes index I. Then, at step 104, processor(s) 50 receives, from the aircraft, aircraft conditions including airspeed A(I), angle of attack AOA(I), and angle of side-slip AOS(I). The method then proceeds to step 106 where processor(s) 50 receives, from the aircraft, atmospheric conditions including temperature T(I) and pressure P(I). The method proceeds to step 108 where processor(s) 50 retrieves, from data memory, a maximum water droplet size $D_{MAX}$.

The method then proceeds to step 110 where processor(s) 50 calculates a boundary location B(I) based on the received aircraft conditions, A(I), AOA(I), and AOS(I), the received atmospheric conditions, T(I) and P(I), and the retrieved maximum water droplet size $D_{MAX}$. Then at step 112, processor(s) 50 determines a location TL(I) within a testing region that corresponds to the calculated boundary location B(I). Method 100 proceeds to step 114 where processor(s) 50 receives, from the ice detector 44 (depicted in FIG. 5) a signal indicative of ice formation at the determined location TL(I). Processor(s) 50 evaluates whether ice has formed at the determined location TL(I) based on the received signal. If, at step 114, processor(s) 50 determine that ice has not formed at the determined location TL(I), then at step 116 processor(s) 50 clears the alert signal ALERT. If, however, at step 114, processor(s) 50 determine that ice has formed at the determined location TL(I), then at step 118 processor(s) 50 sets the alert signal ALERT. Method 100 proceeds from steps 116 and/or 118 to step 120, at which processor(s) 50 increment index I. Then, method 100 returns to step 104 and repeats.

In some embodiments, the output of an ice-accretion detection system can determine a maximum super-cooled water-droplet size based on a measured extent of ice formation on an exterior surface of the aircraft. The ice-accretion detection system can provide, as an output, a signal indicative of the determined maximum super-cooled water-droplet size. This output signal may then be used by a receiving system to determine whether an alert signal is generated.

In an exemplary embodiment, a super-cooled water-droplet size distribution of an atmosphere exterior to an aircraft can be calculated. Distinct locations on an exterior surface of an aircraft may be susceptible to ice accretion arising from super-cooled water droplets exceeding a predetermined size striking the distinct location. For example, ice may form at each distinct location, only if the atmosphere external to the aircraft includes super-cooled water droplets that exceed the predetermined size corresponding to that distinct location. By measuring a rate of ice accretion at a plurality of locations along a chord from the stagnation point toward an aft location, a water-droplet size distribution can be calculated.

For example, ice may accrete at a boundary location that separates an ice-accretion region from an ice-free region due to an atmosphere that has super-cooled water-droplets up to a maximum size. Only the super-cooled water droplets that are of the maximum size may cause ice-accretion at the boundary location. And then, at locations more forward from the boundary location, ice may accrete due to super-cooled water-droplets that have sizes that span between a lower threshold and the maximum size. As one travels toward the stagnation point, ice accretes due to a span of sizes of super-cooled water droplets that includes smaller and smaller sizes. By measuring the amount and/or the rate of ice accretion at each of these points, a reconstruction of a super-cooled water-droplet size distribution can be calculated.

In some embodiments, a heating system is repeatedly used to melt, evaporate, and/or sublimate ice accreted on the testing region. Such a heating system can facilitate testing in conditions in which ice accretion slows or stops due to improving atmospheric conditions. After melting or sublimating any accreted ice from the testing region, the heater may be turned off so that ice may again accrete if conditions permit such accretion. In an exemplary embodiment, the heater can be operated cyclically, such that each cycle has a heating portion, and ice accretion portion, and an ice detection portion. The heater can be activated during the heating portion and deactivated during the ice accretion and ice detection portions. Such an embodiment may repeatedly evaluate ice accretion so as to provide current icing data to a user.

In an exemplary embodiment, a testing region of an exterior surface of an aircraft is monitored for ice accretion. The testing region can be located such that it includes a location upon which ice can accrete only if super-cooled water droplets of a size that exceeds a predetermined testing limit are present. If ice accretes in such a location, then an alert signal may be generated. In some embodiments the testing region will present a convex shape to the atmosphere. In some embodiments, the exterior surface of the aircraft will be intentionally shaped so as to include locations upon which ice can accrete only if super-cooled water droplets of a size that exceeds a predetermined testing limit are present. For example, a bubble may be formed in a side window of a cockpit. The bubble may project out of the side window, for example, to present a convex shape to the outside atmosphere.

In various embodiments, various exterior surfaces of an aircraft may be used as testing regions for ice accretion. For example, in some embodiments, a propeller spinner may be used as an ice-accretion testing region. In some embodiments, a leading edge of a rescue hoist may be used as an ice-accretion testing region. In some embodiments, a strut can be used as an ice-accretion testing surface, for example.

Figure 7:
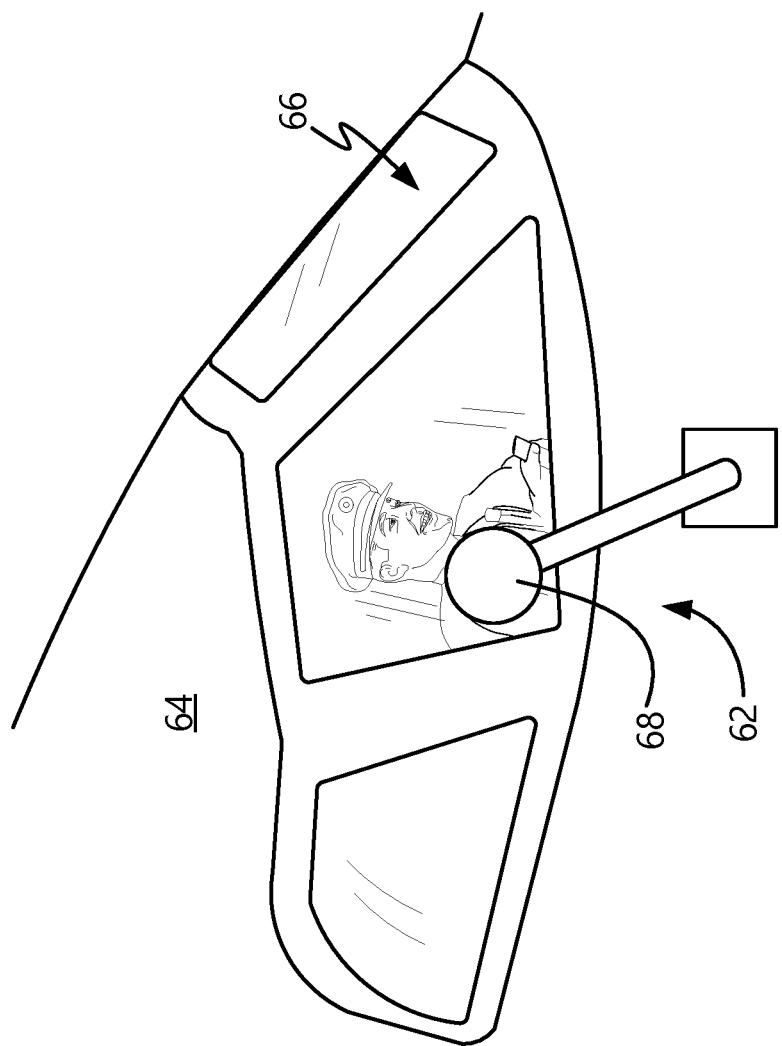
FIG. 7 is a schematic view of an exemplary super-cooled water-droplet size measurement system that is attachable to an aircraft.

FIG. 7 is a schematic view of an exemplary super-cooled water-droplet size measurement system that is attachable to an aircraft. In FIG. 7, super-cooled water-droplet size measurement system 62 is attached to aircraft 64 outside of cockpit 66. Super-cooled water-droplet size measurement system 62 has housing 68 that includes a convex forward-facing exterior surface so as to expose the convex forward-facing exterior surface to an airstream of aircraft 64 when in flight. When so exposed to an airstream atmosphere that includes super-cooled water-droplets, ice can accrete on the convex forward-facing surface.

A control system can be located within housing 68. The control system can determine locations where ice accretes on the convex forward-facing exterior surface. In some embodiments, the control system can receive signals from a series of spot sensors located on the convex forward-facing exterior surface of housing 68. In some embodiments, a camera can be located within housing 68. In some embodiments, a laser based system can probe an exterior surface for ice accretion Housing 68 can include transparent and/or translucent materials. Portions of the convex forward-facing exterior surface that have ice accreted thereon may image differently than portions of the convex forward-facing exterior surface that are ice free, for example.

The control system may determine, based on an extent of the ice accretion portion of the convex forward-facing exterior surface, a maximum size of super-cooled water-droplets. In some embodiments, the control system may determine, based on a rate of ice accretion and/or a measured amount of ice accretion at multiple locations of the convex forward-facing exterior surface, a super-cooled water-droplet distribution in the atmosphere. The control system can then communicate the calculated information (e.g., maximum size, distribution, or super-cooled water-droplets) to the aircraft and/or pilot, for example. In an exemplary embodiment, the control system may generate an alert if the maximum size of super-cooled water-droplets is determined to be greater than a predetermined threshold.

In some embodiments, the housing is rigidly attached to an aircraft in such a way that the housing has a fixed orientation with respect to the aircraft. In such embodiments, the stagnation point can be a function of flying conditions. For example, the stagnation point can change as a function of airspeed, angle of attack, angle of sideslip, etc. As the stagnation point changes, the location of the boundary that separates the ice-accretion portion of the testing region from the ice-free portion of the testing region can also change. If a housing is semi-hemispherical or hemispherical in shape, various flying conditions by locating the point of symmetry of the ice-accretion region. By locating the boundary that separates the ice-accretion portion of the testing region from the ice-free portion of the testing region on opposite sides of the stagnation point, however, the flying conditions can be determined, as well as the maximum super-cooled water droplet sizes. For example, by testing opposite lateral sides of the stagnation point, an angle of sideslip can be determined. And by testing opposite vertical sides of the stagnation point, an angle of attack can be determined. In both such cases, a maximum size of super-cooled water droplets in the cloud atmosphere can be determined.

In some embodiments, the housing is attached to an aircraft in a non-rigid fashion, so as to permit the housing to orient a leading edge of the housing so that it is the stagnation point under various flying conditions. For example, by mounting the housing using a gimballed telescope assembly, the orientation of the leading edge can be changed in response to changing flying conditions. In some embodiments, a weathervane type of mounting system can facilitate an automatic orientation of the housing in response to variations in flying conditions. For example, one or more fins can be coupled to a trailing end of the housing.

Various flying conditions can cause variations in local cooling of exterior surfaces of the aircraft and of the housing. For example, local variations in airspeed proximate surfaces of the aircraft can cause local cooling variations. Ice formation conditions can therefore vary locally as well. For example, the icing conditions of the housing may not be exactly the same as the icing conditions of a control surface of an aircraft. In some embodiments, a temperature control system can control a temperature of the housing, so as to better align icing conditions of the housing with those of various control surfaces of the aircraft to which the housing is attached. In some embodiment, the temperature control system can be used simply to ensure that the exterior surface of the aircraft is cool enough to cause icing so that a maximum droplet size can be determined. For example, a cooling system can be configured to actively cool the convex exterior surface of the housing.

Such temperature control systems can also be used to heat the testing regions so as to sublimate, melt, and/or evaporate ice accreted to such regions. Such temperature control capabilities can be used to provide cycles of operation that include a heating portion, an accretion portion, and a sensing portion. The heater can be activated during the heating portion to remove any ice accreted to the testing region. The heater can then be deactivated during the accretion portion and during the sensing portions. In some embodiments, the testing region can be cooled, before or during the accretion and/or sensing portions. The ice detector can then be activated during the sensing portion. Some embodiments can include an alert system to generate an alert if the ice detector detects ice at testing locations indicative of super-cooled water droplets having sizes that exceed a predetermined threshold.

Figure 8:
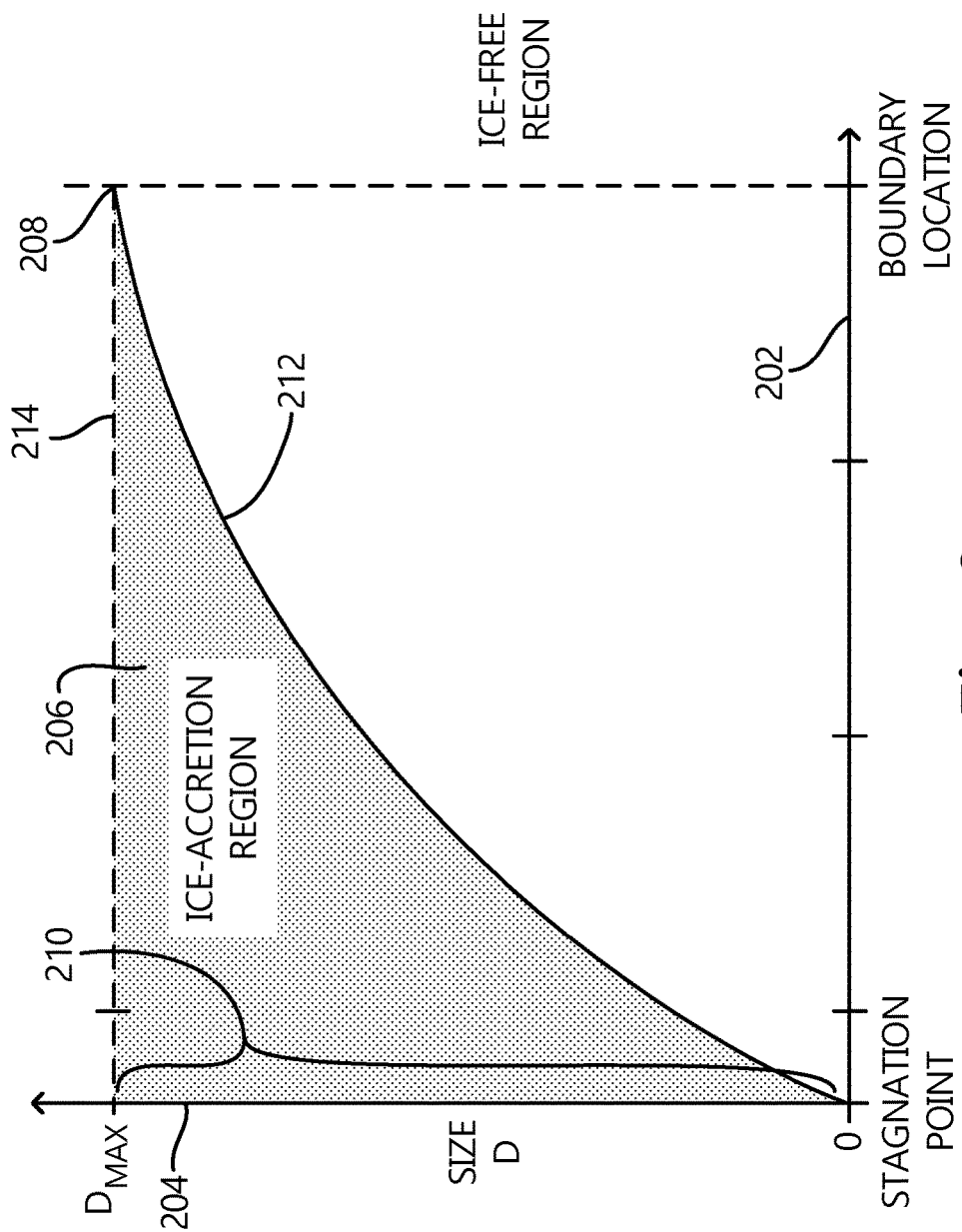
FIG. 8 is a graph depicting a size span of water-droplets vs. location along a chord of a convex-shaped housing.

FIG. 8 is a graph depicting a size span of water-droplets vs. location along a chord of a convex-shaped housing. In FIG. 8, graph 200 has horizontal axis 202 and vertical axis 204. Horizontal axis 202 represents location along a chord of a convex exterior surface exposed to an atmosphere containing super-cooled water droplets. Vertical axis 204 represents a size of the super-cooled water droplets. Graph 200 includes droplet size/location relation 206 corresponding to a size of super-cooled droplets that can strike the convex exterior surface at the indicated location. For example, at a given location along the convex-shaped housing (e.g., draw a vertical line from any x-axis location), the exterior surface of the convex-shaped housing will be impinged by droplets exceeding some minimum size up until the maximum sized droplet contained in the cloud atmosphere. Line 212 identifies the relation corresponding to the predetermined minimum size of super-cooled water droplets that contribute to ice accretion vs. location along the chord of the convex shaped housing. Droplets smaller than the minimum size will follow the airflow vectors and will not impinge the convex-shaped housing except at locations near the stagnation point. Dashed line 214 identifies the maximum size of super-cooled water droplets contained in the cloud atmosphere.

For a given size of a super-cooled water droplet (e.g., draw a horizontal line from any y-axis location), the exterior surface of the convex-shaped housing will be impinged for the stagnation point up to a maximum impingement location corresponding to the given size of super-cooled water droplet. Point 208 of relation 206 corresponds to the boundary location separating an ice accretion portion and an ice-free portion of the convex exterior surface for the cloud atmosphere having the maximum size of super-cooled water droplet corresponding to dashed line 214. Not all sizes of particles, however, contribute to ice accretion at every location within the ice accretion portion of the convex exterior surface. At point 208, relation 206 indicates that only super-cooled water droplets equal to the maximum size (or greater if the cloud atmosphere had greater sized particles) accrete at the boundary location. The region to the right of point 208 on graph 200 corresponds to the ice-free portion of the convex exterior surface, and points to the left of point 208 correspond to the ice-accretion portion of the convex exterior surface.

Vertical line 210 of relation 206 corresponds to the stagnation point of the convex exterior surface. At the stagnation point corresponding to vertical line 210, super-cooled water droplets of all sizes within the atmosphere contribute to ice accretion. Between point 208 and vertical line 210, super-cooled water droplets that have a size greater than a predetermined minimum will contribute to ice accretion. Super-cooled water droplets smaller than the predetermined minimum size will follow the flow vector lines and not impinge the convex exterior surface, and therefore will not contribute to ice accretion. Line 212 identifies the relation corresponding to the predetermined minimum size of super-cooled water droplets that contribute to ice accretion vs. location along the chord of the convex shaped housing.

The following are non-exclusive descriptions of possible embodiments of the present invention.

A super-cooled water droplet measurement system that includes an ice detector configured to detect ice accretion at a plurality of test locations within a testing region of an exterior surface of an aircraft. Ice accretes, in conducive conditions, on at least an ice-accretion portion of the testing region. The super-cooled water droplet measurement system includes a boundary locator configured to determine a specific one of the plurality of test locations within the testing region of the exterior surface of the aircraft. The determined specific one of the plurality of test locations corresponding to a boundary that separates the ice-accretion portion of the testing region and an ice-free portion of the testing region in conditions that include the atmosphere having super-cooled water droplets up to a predetermined maximum size.

The super-cooled water-droplet size measurement system of the preceding paragraph can optionally include, additionally and/or alternatively, any one or more of the following features, configurations and/or additional components: an alert system; a droplet-size calculator; a droplet-size distribution calculator; and a heater. The alert system can be configured to generate, in response to detection by the ice detector of ice accretion at the determined specific one of the plurality of test locations, an alert. The droplet-size calculator can be configured to calculate a plurality of water-droplet sizes, each corresponding to one of the plurality of test locations of the testing region. Each of the calculated water-droplet sizes correspond to a droplet size, below which water droplets do not contribute to ice accretion at the corresponding test location. The droplet-size distribution calculator can be configured to calculate, based on the detected ice accretion at the plurality of test locations, a super-cooled water-droplet size distribution. The heater can be configured to heat the testing region so as to melt, evaporate, and/or sublimate any ice accreted thereto.

A further embodiment of any of the foregoing super-cooled water-droplet size measurement systems, wherein the testing region can include a convex surface region of the exterior surface of the aircraft. A further embodiment of any of the foregoing super-cooled water-droplet size measurement systems, wherein the testing region can include a convex surface region of a side window of a cockpit of the aircraft. A further embodiment of any of the foregoing super-cooled water-droplet size measurement systems, wherein the ice detector can include a camera configured to obtain images of the testing region. A further embodiment of any of the foregoing super-cooled water-droplet size measurement systems, wherein the boundary locator can include a plurality of spot sensors. A further embodiment of any of the foregoing super-cooled water-droplet size measurement systems, wherein the ice-accretion alert system can be configured to provide cycles of operation that include a heating portion, an accretion portion and a sensing portion of each of the provided cycles. The heater can be activated during the heating portion, and the heater can be deactivated during the accretion and sensing portions. The ice detector can be activated during the sensing portion. A further embodiment of any of the foregoing super-cooled water-droplet size measurement systems, wherein the specific one of the plurality of test locations can be determined by the boundary locator based on at least one of: an angle of attack; angle of sideslip; airspeed, and total air temperature.

A method for generating an alert if atmosphere exterior to an aircraft has super-cooled water droplets exceeding a predetermined size that includes providing a testing region of an exterior surface of an aircraft. The testing region is configured to permit, if conditions are conducive, ice accretion on at least an ice-accretion portion of the testing region. A boundary separates the ice-accretion portion from an ice-free portion of the testing region. A location of the boundary is indicative of a maximum size of super-cooled water droplets in an atmosphere. The method includes determining a test location within the testing region. The test location corresponds to a calculated boundary that separates the ice-accretion portion of the testing region and the ice-free portion in conditions that include an atmosphere having super-cooled water droplets exceeding the predetermined size. The method includes monitoring the determined test location within the testing region to detect whether ice accretes at the monitored test location.

The method of the preceding paragraph can optionally include, additionally and/or alternatively, any one or more of the following features, configurations and/or additional components: generating an alert signal; calculating a plurality of water-droplet sizes; and calculating a super-cooled water-droplet size distribution. The alert signal can be generated in response to ice accretion being detected at the monitored test location within the testing region. For the calculation of the plurality of water droplet sizes, each of the plurality of water-droplet sizes can correspond to one of a plurality of test locations of the testing region. Each of the calculated water-droplet sizes can correspond to a droplet size, below which water droplets do not contribute to ice accretion at the corresponding test location. The super-cooled water-droplet size distribution can be calculated based on the detected ice accretion at the plurality of test locations.

A further embodiment of any of the foregoing methods, wherein determining the test location within the testing region can include associating the test location as a function of the predetermined size of super-cooled water droplets. A further embodiment of any of the foregoing methods, wherein determining the test location within the testing region can include calculating the test location using computational fluid dynamics. A further embodiment of any of the foregoing methods, wherein determining the test location within the testing region can include calculating a test location based on at least one of: airspeed; angle of attack; angle of sideslip; and total air temperature. A further embodiment of any of the foregoing methods, wherein monitoring the determined test location can include imaging the test region using a camera. A further embodiment of any of the foregoing methods, wherein monitoring the determined test location further can include processing a test pixel of an image obtained by the camera, the test pixel imaging the determined test location.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A super-cooled water-droplet size measurement system comprising:
    an ice detector configured to detect ice accretion at a plurality of test locations within a testing region of an exterior surface of an aircraft, wherein ice accretes, in conductive conditions, on at least an ice-accretion portion of the testing region; and
    a boundary locator configured to determine a specific one of the plurality of test locations within the testing region of the exterior surface of the aircraft, the determined specific one of the plurality of test locations corresponding to a boundary that separates the ice-accretion portion of the testing region and an ice-free portion of the testing region in conditions that include the atmosphere having super-cooled water droplets up to a predetermined maximum size.

2. The super-cooled water-droplet size measurement system of claim 1, further comprising an alert system configured to generate, in response to detection by the ice detector of ice accretion at the determined specific one of the plurality of test locations, an alert.

3. The super-cooled water-droplet size measurement system of claim 1, wherein the testing region comprises a convex surface region of the exterior surface of the aircraft.

4. The super-cooled water-droplet size measurement system of claim 1, wherein the testing region comprises a convex surface region of a side window of a cockpit of the aircraft.

5. The super-cooled water-droplet size measurement system of claim 1, further comprising a droplet-size calculator configured to calculate a plurality of water-droplet sizes, each corresponding to one of the plurality of test locations of the testing region, each of the calculated water-droplet sizes correspond to a droplet size, below which water droplets do not contribute to ice accretion at the corresponding test location.

6. The super-cooled water-droplet size measurement system of claim 5, further comprising a droplet-size distribution calculator configured to calculate, based on a detected ice accretion rate at the plurality of test locations, a super-cooled water-droplet size distribution.

7. The super-cooled water-droplet size measurement system of claim 1, wherein the ice detector comprises a camera configured to obtain images of the testing region.

8. The super-cooled water-droplet size measurement system of claim 1, wherein the boundary locator comprises a plurality of spot sensors.

9. The super-cooled water-droplet size measurement system of claim 1, further comprising a heater configured to heat the testing region so as to melt, evaporate, and/or sublimate any ice accreted hereto.

10. The super-cooled water-droplet size measurement system of claim 7, wherein the ice-accretion alert system is configured to provide cycles of operation that include a heating portion, an accretion portion and a sensing portion of each of the provided cycles, wherein the heater is activated during the heating portion, and the heater is deactivated during the accretion and sensing portions, and the ice detector is activated during the sensing portion.

11. The super-cooled water-droplet size measurement system of claim 1, wherein the specific one of the plurality of test locations is determined by the boundary locator based on at least one of: an angle of attack, angle of sideslip; airspeed; and total air temperature.

12. A method for generating an alert if atmosphere exterior to an aircraft has super-cooled water droplets exceeding a predetermined size, the method comprising:
    detecting, via an ice detector, ice accretion at a plurality of test locations within a testing region of an exterior surface of an aircraft, wherein ice accretes, in conductive conditions, on at least an ice-accretion portion of the testing region; and
    determining, via a boundary locator, a specific one of the plurality of test locations within the testing region of the exterior surface of the aircraft, the determined specific one of the plurality of test locations corresponding to a boundary that separates the ice-accretion portion of the testing region and an ice-free portion of the testing region in conditions that include the atmosphere having super-cooled water droplets up to a predetermined maximum size.

13. The method of claim 12, further comprising:
    generating an alert signal in response to ice accretion being detected at the determined specific one of the plurality of test locations within the testing region.

14. The method of claim 12, wherein determining the specific one of the plurality of test location within the testing region comprises:
    associating the specific one of the plurality of test locations as a function of the predetermined size of super-cooled water droplets.

15. The method of claim 12, wherein determining the specific one of the plurality of test locations within the testing region comprises:
    calculating the specific one of the plurality of test locations using computational fluid dynamics.

16. The method of claim 12, wherein determining the specific one of the plurality of test locations within the testing region comprises:
    calculating the specific one of the plurality of test location based on at least one of: airspeed, angle of attack, angle of sideslip; and total air temperature.

17. The method of claim 12, wherein monitoring the determined test location comprises:
    imaging the test region using a camera.

18. The method of claim 12, wherein detecting ice accretion at a plurality of test locations further comprises processing, for each of the plurality of test locations, a test pixel of an image obtained by the camera, the test pixel imaging the determined test location.

19. The method of claim 12, further comprising:
calculating a plurality of water-droplet sizes, each corresponding to one of a plurality of test locations of the testing region, each of the calculated water-droplet sizes correspond to a droplet size, below which water droplets do not contribute to ice accretion at the corresponding test location.

20. The method of claim 19, further comprising:
calculating, based on a detected ice accretion rate at the plurality of test locations, a super-cooled water-droplet size distribution.

* * * * *